Figure 1:
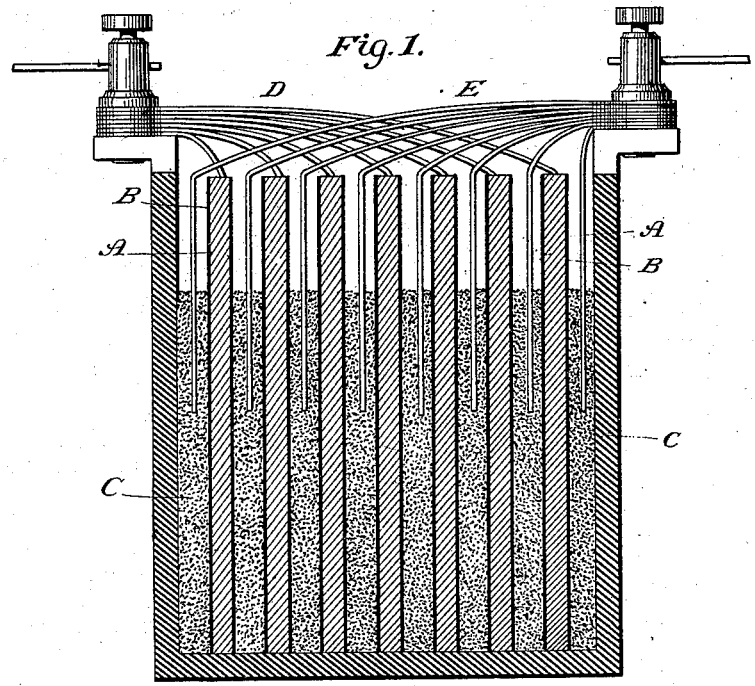

(No Model.)

A. K. EATON.
SECONDARY BATTERY.

No. 268,360. Patented Nov. 28, 1882.

Attest:
R. F. Barnes.
W. Frisby

Inventor:
A. K. Eaton
By Parker W. Page
atty.

United States Patent Office.

ASAHEL K. EATON, OF BROOKLYN, N. Y., ASSIGNOR OF TWO-THIRDS TO WILLIAM WALLACE AND THOMAS WALLACE, BOTH OF ANSONIA, CONN.

SECONDARY BATTERY.

SPECIFICATION forming part of Letters Patent No. 268,360, dated November 28, 1882.

Application filed April 15, 1882. (No model.)

*To all whom it may concern:*

Be it known that I, ASAHEL K. EATON, a citizen of the United States, and a resident of Brooklyn, in the county of Kings and State of New York, have invented certain new and useful Improvements in Secondary Batteries, of which the following is a specification, reference being had to the accompanying drawings.

The subject of my present invention is a novel and efficient form of secondary or storage battery. The batteries of this type which have heretofore been in use contain generally plates of lead in various forms, and an electrolytic solution—such as dilute sulphuric acid— or a plate of lead and a plate of copper in an electrolytic solution, such as of sulphate of copper, of sulphate of zinc, or of similar metallic salt. My object is to obviate certain inherent objections to these forms of battery and to produce cells of great efficiency and small cost which are readily and easily charged and freely and evenly discharged. When both plates are formed of lead great difficulty is encountered in forming or preparing the plates. On the other hand, when a copper plate is employed in a solution of a metallic salt it is difficult to obtain a steady discharge, probably for the reason that in the preliminary process of charging the metal from the solution is deposited on the copper so solidly that it is not readily dissociated in the subsequent operation of discharging the cells. To avoid these objections I employ, in conjunction with an element of suitable metal and a solution of sulphate of copper, sulphate of iron, or other metallic salt, an element composed of comminuted or finely-divided conducting material. Upon this as an electrode the metal from the solution is deposited in such manner that it is readily given back, and the battery by this means rendered capable of giving a steady and even current.

The conditions under which I design applying this improvement to the construction of storage-batteries I will now proceed to state.

As the negative element, I use any of the metals heretofore employed for this purpose, the plan of construction of the cells being modified to meet the requirements of particular cases. In practice I prefer to use amalgamated-lead plates, or an electrode formed of spongy lead prepared as set forth by me in another application. When amalgamated-lead plates are used I inclose them in asbestus-board, cloth, or similar material, so that each will be contained in a sheathing which is the equivalent of a porous cup. I then place as many of these as may be necessary or convenient in a containing-vessel, and fill in the spaces between them with a suitable quantity of a comminuted or finely-divided conducting material, using for this purpose carbon, and preferably ordinary retort carbon, either alone or mixed with finely-divided metal. The lead plates are connected to form one pole and a strip of copper or other metal is embedded in the layers of carbon to form the other pole. The cell is then completed by the addition of the solution of the electrolyte. This may be sulphate of iron, of copper, of zinc, or other metallic salt.

Instead of inclosing the lead plates in sheathings of non-conducting porous substances, as above, I may employ ordinary porous cups. When this is done it is advisable to use acidulated water in the porous cups, in which the lead plates are immersed, the outer space being filled with solution of sulphate of copper or other metallic salt. I have found, however, that the best results are obtained by the employment of an element of spongy lead in place of the amalgamated-lead plates above described, either inclosed in the porous sheathings or immersed in acidulated water in porous cups. This sponge, as set forth in another application, is produced in the following manner: A thin sheet of lead with large perforations is employed as the conducting support for the sponge. To attach the spongy mass, two pieces of sheet-zinc, of the same size as the perforated plate, are covered on one side with Japan or other varnish, for the protection of that side from chemical action. On the bottom of a shallow platter one piece of zinc is laid, with the varnished side down. On this is laid the perforated lead plate, and over the latter is laid the other zinc plate, with the varnished side up. The plates thus arranged in the shallow vessel are covered with a solution of acetate of lead, which is immediately decomposed by the zinc, the lead being deposited upon both sides of the skeleton plate in the form of a thick layer of fine spongy crystalline lead. The spongy plates thus formed are inclosed in sheathings of asbestos-board or suspended in porous cups, and used in conjunction with an electrode of powdered or crushed carbon in the same manner as the amalgamated plates above described.

When batteries thus constructed are to be used they are first connected with a primary or galvanic battery, a dynamo-electric machine, or other source of current, whereupon the electrolysis of the metallic solution results in the deposition of the metal upon the divided carbon, the oxidation of the lead surfaces to peroxide, and the change of the solution used to acidulated water. In the discharge of the accumulated energy the metal is redissolved, and dissociated from the carbon, and the solution returns to its original condition. It is important, however, to use an amount of solution so large that the copper is not wholly precipitated, since I have found the loss or leakage by remaining charged a long time is diminished thereby.

In the above, carbon is named as the material composing the positive element. It is evident, however, that other conducting substances—such as platinum or copper—may be used in a finely-divided state, either with or without an admixture of granulated carbon. I prefer, however, to use finely-divided carbon—and the finer the better—as the positive element and a solution of sulphate of copper as the electrolyte. The main advantages of such use are that the copper, under the influence of the current, is distributed over a very large surface, is in a very loose porous condition, and redissolves readily, and also in the great reduction in the weight of the battery. Before putting the powdered carbon in the cells I partially coat it with copper, having found this to be attended with advantageous results.

In the accompanying drawings I have illustrated the general forms of battery above described.

Figure 1 is a sectional view of a cell containing a number of amalgamated or spongy lead plates, A, inclosed in sheathings of asbestus-board, B. The layers of carbon are designated by the characters C C; and D E, the connections for the plates and the carbon layers, respectively, which constitute the poles of the battery.

Figure 2:
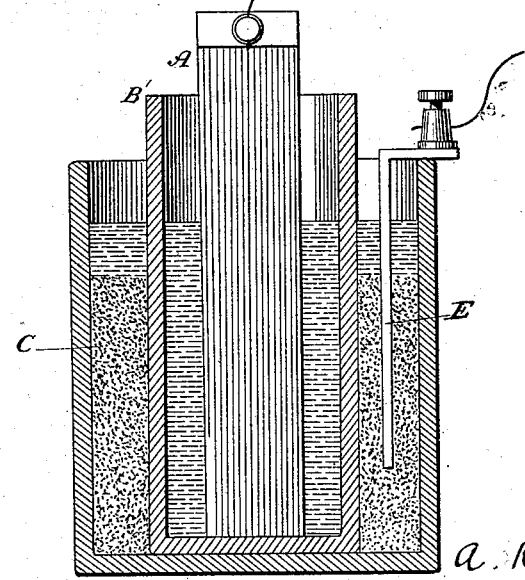

In Fig. 2, which is designed to illustrate the arrangement of parts in a battery containing a porous cell, A is the negative element, whether amalgamated or spongy lead; B', the porous cup, and C the powdered carbon. The connection may be made from the carbon by a rod of carbon, E', instead of the copper wires used in the other forms of battery.

It is evident that the form or arrangement of the several parts of the cells may be greatly modified without affecting my invention.

Without reference, therefore, to the special construction of the battery, what I claim as new and of my invention is—

1. In a secondary or storage battery, the combination of a metallic element capable of being rendered electro-negative by the passage through it of an electric current in the manner described, an electrolytic solution of metallic salt, and a positive element composed of comminuted or powdered conducting material, as set forth.

2. In a secondary or storage battery, the combination of a metallic element capable of being rendered electro-negative by the passage through it of an electric current in the manner described, an electrolytic solution of metallic salt, and a positive element composed of comminuted or powdered carbon.

3. In a secondary or storage battery, the combination of a negative element of lead, an electrolytic solution of metallic salt, and a positive element composed of comminuted or powdered carbon.

4. In a secondary or storage battery, the combination of a negative element composed of spongy lead, a solution of sulphate of copper, and a positive element of comminuted or finely-divided carbon, or carbon and metal, in a loose state, as set forth.

In testimony whereof I have hereunto set my hand this 14th day of April, 1882.

A. K. EATON.

Witnesses:
W. FRISBY,
PARKER W. PAGE.